(12) United States Patent
Kawasaki et al.

(10) Patent No.: US 11,490,020 B2
(45) Date of Patent: Nov. 1, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Ryo Kawasaki, Kanagawa (JP); Natsuko Sato, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/471,973

(22) Filed: Sep. 10, 2021

(65) Prior Publication Data

US 2022/0086356 A1 Mar. 17, 2022

(30) Foreign Application Priority Data

Sep. 14, 2020 (JP) .............................. JP2020-154009
Jun. 25, 2021 (JP) .............................. JP2021-105980

(51) Int. Cl.
*H04N 5/232* (2006.01)
*G06V 10/22* (2022.01)
*G06V 10/147* (2022.01)

(52) U.S. Cl.
CPC ....... *H04N 5/23299* (2018.08); *G06V 10/147* (2022.01); *G06V 10/235* (2022.01); *H04N 5/232127* (2018.08)

(58) Field of Classification Search
CPC ......... H04N 5/23299; H04N 5/232127; H04N 5/23212; H04N 5/2253; H04N 5/23245;
(Continued)

(56) References Cited

U.S. PATENT DOCUMENTS 8,792,018 B2 * 7/2014 Matsuzawa ...... H04N 5/232945
348/333.01
11,089,200 B2 * 8/2021 Nagano .............. H04N 5/23212
(Continued)

FOREIGN PATENT DOCUMENTS

EP 3722871 A1 10/2020
EP 3799417 A1 3/2021
(Continued)

OTHER PUBLICATIONS

Documents were cited in a European Search Report dated Feb. 15, 2022, which is enclosed, that issued in the corresponding European Patent Application No. 21195433.4.

*Primary Examiner* — Pritham D Prabhakher
(74) *Attorney, Agent, or Firm* — Cowan, Liebowitz & Latman, P.C.

(57) ABSTRACT

There is provided with an information processing apparatus. A control unit performs tilt control for tilting an image capturing element with respect to a plane perpendicular to an optical axis of an image capturing optical system about a rotation axis, and perform focus control for moving a focus lens in a direction of the optical axis. A setting unit sets a target region in a captured image obtained by an image capturing unit. A determining unit determines, based on a position corresponding to a position of the rotation axis in the image and a position of the target region in the image, a correction amount of a position of the focus lens, wherein the focus lens is moved based on the correction amount.

19 Claims, 11 Drawing Sheets

(58) Field of Classification Search
CPC ......... H04N 5/232123; H04N 5/23296; G06V 10/147; G06V 10/235; G02B 7/09; G02B 7/102; G03B 13/36
USPC .................................................. 348/207.99
See application file for complete search history.

(56) References Cited

U.S. PATENT DOCUMENTS

| | | | | |
|---|---|---|---|---|
| 11,297,220 | B2* | 4/2022 | Chino | H04N 5/2253 |
| 11,343,432 | B2* | 5/2022 | Sato | H04N 5/2259 |
| 2007/0003268 | A1* | 1/2007 | Uchiyama | H04N 5/23248 396/125 |
| 2008/0165272 | A1* | 7/2008 | Toguchi | H04N 5/2252 348/E5.045 |
| 2013/0258171 | A1* | 10/2013 | Kikuchi | G03B 13/36 348/353 |
| 2017/0192247 | A1* | 7/2017 | Okuda | G03B 5/06 |
| 2017/0353665 | A1* | 12/2017 | Sato | H04N 5/23267 |
| 2019/0199912 | A1* | 6/2019 | Nagano | H04N 5/232125 |
| 2019/0349532 | A1* | 11/2019 | Niga | H04N 5/232933 |
| 2020/0177817 | A1* | 6/2020 | Osawa | H04N 5/23296 |
| 2020/0177820 | A1* | 6/2020 | Kobayashi | H04N 5/23212 |
| 2020/0186690 | A1* | 6/2020 | Kodama | H04N 5/23216 |
| 2020/0213523 | A1* | 7/2020 | Niga | H04N 5/232127 |
| 2020/0236290 | A1* | 7/2020 | Kawasaki | G03B 3/10 |
| 2020/0296296 | A1* | 9/2020 | Chino | H04N 5/232125 |
| 2020/0304721 | A1* | 9/2020 | Sugaya | H04N 5/23216 |
| 2021/0067702 | A1* | 3/2021 | Sato | H04N 5/2253 |
| 2021/0067704 | A1* | 3/2021 | Chino | H04N 5/232123 |

FOREIGN PATENT DOCUMENTS

| | | |
|---|---|---|
| JP | 2008-205569 A | 9/2008 |
| JP | 2017-173802 A | 9/2017 |
| JP | 2018-056810 A | 4/2018 |

* cited by examiner

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

There is known a technique called a Scheimpflug principle that changes a depth of field of a captured scene by adjusting a focal plane by rotating (performing tilt control on) an image capturing plane so as to tilt the image capturing plane toward a plane perpendicular to an optical axis of an image capturing system for capturing an image of an object. According to this technique, decreasing the depth of field will allow an image in which parts other than the main object have been blurred to be obtained, and increasing the depth of field without stopping down will allow an image with a clear focus on the entire image capturing region to be obtained while suppressing noise or blurring of an object caused by an insufficient light amount.

Japanese Patent Laid-Open No. 2008-205569 discloses an image capturing apparatus that captures a portrait in which parts other than a main object are blurred by performing tilt control upon focusing on the main object. In addition, Japanese Patent Laid-Open No. 2018-056810 discloses a technique in which an image capturing plane is rotated about a focus point designated in tilt control by employing an arrangement in which the image capturing plane is rotated about an arbitrary point as a rotation axis.

SUMMARY OF THE INVENTION

According to one embodiment of the present invention, an information processing apparatus comprises: a control unit configured to perform tilt control for tilting an image capturing element with respect to a plane perpendicular to an optical axis of an image capturing optical system about a rotation axis, and perform focus control for moving a focus lens in a direction of the optical axis; a setting unit configured to set a target region in a captured image obtained by an image capturing unit; and a determining unit configured to determine, based on a position corresponding to a position of the rotation axis in the image and a position of the target region in the image, a correction amount of a position of the focus lens, wherein the control unit moves the focus lens based on the correction amount.

According to another embodiment of the present invention, an information processing method comprises: performing tilt control for tilting an image capturing element with respect to a plane perpendicular to an optical axis of an image capturing optical system about a rotation axis, and perform focus control for moving a focus lens in a direction of the optical axis; setting a target region in a captured image obtained by an image capturing unit; and determining, based on a position corresponding to a position of the rotation axis in the image and a position of the target region in the image, a correction amount of a position of the focus lens, wherein the focus lens is moved based on the correction amount.

According to still another embodiment of the present invention, a non-transitory computer-readable storage medium storing a program that, when executed by a computer, causes the computer to perform a method, the method comprises: performing tilt control for tilting an image capturing element with respect to a plane perpendicular to an optical axis of an image capturing optical system about a rotation axis, and perform focus control for moving a focus lens in a direction of the optical axis; setting a target region in a captured image obtained by an image capturing unit; and determining, based on a position corresponding to a position of the rotation axis in the image and a position of the target region in the image, a correction amount of a position of the focus lens, wherein the focus lens is moved based on the correction amount.

Further features of the present invention will become apparent from the following description of exemplary embodiments (with reference to the attached drawings).

DESCRIPTION OF THE EMBODIMENTS

Figure 1:
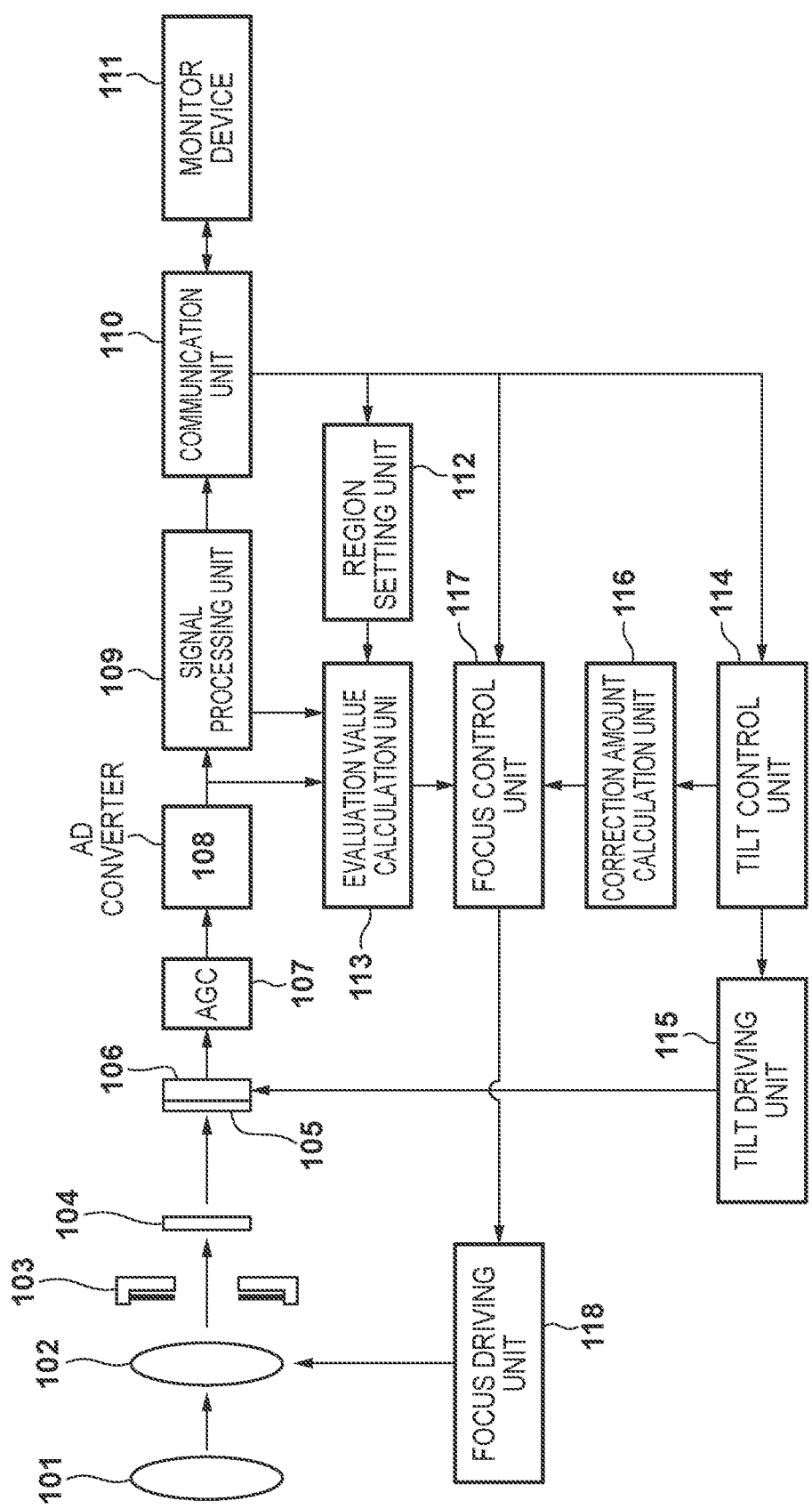
FIG. 1 is a block diagram showing an example of the functional arrangement of an information processing apparatus according to the first embodiment.

In the technique disclosed in Japanese Patent Laid-Open No. 2008-205569, since the rotation axis of the tilt control is fixed and focus adjustment is performed on an object on a center line of an image capturing element, the focus will change and become blurred if the object is not present on the center line. On the other hand, in the technique disclosed in Japanese Patent Laid-Open No. 2018-056810, it is possible to focus on a designated focus point, but a complicated hardware arrangement is required to drive an arbitrary point as a rotation axis.

An embodiment of the present invention can use a simple hardware arrangement to perform tilt control while maintaining focus on an arbitrary region in an image capturing region.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An information processing apparatus according to the first embodiment includes an image capturing element and an image capturing optical system. In addition, the information processing apparatus according to this embodiment sets a target region in an image captured by an image capturing unit, and corrects a focus position by calculating a correction amount of the focus position of the target region in accordance with tilt control performed to change a relative posture between the image capturing element and the image capturing optical system.

FIG. 1 shows an example of the functional arrangement of the information processing apparatus according to the embodiment. An image capturing optical system of an information processing apparatus 100 according to this embodiment forms an object image by using a process similar to that of a general image capturing optical system. Thus, a detailed description of each process will be omitted. The information processing apparatus 100 includes a zoom lens 101 that moves in an optical-axis direction to change a focal length, a focus lens 102 that moves in the optical-axis direction to adjust a focus position, and a stop portion 103 that adjusts a light amount. The light that passed the image capturing optical system forms an object image as an optical image on an image capturing element 106 via a band pass filter (BPF) 104 and a color filter 105. The BPF 104 may be movable along an optical path of the image capturing optical system.

The image capturing element 106 photoelectrically converts the object image. After an analog electrical signal (image capturing signal) output from the image capturing element 106 undergoes gain adjustment by an AGC 107 and is converted into a digital signal by an AD converter 108, the converted signal is input to a signal processing unit 109. The signal processing unit 109 executes various kinds of image processing on the input digital signal to generate an image signal. Next, the signal processing unit 109 outputs, via a communication unit 110, the image signal to a monitor device 111 which is connected to the information processing apparatus 100 by wired or wireless communication. The monitor device 111 outputs a control signal such as a command or the like to a region setting unit 112, a tilt control unit 114, or a focus control unit 117 in the information processing apparatus 100 to cause each processing unit to perform processing (to be described later).

The region setting unit 112 sets, based on an instruction from the communication unit 110, a target region to set focus on in the object image on the image capturing element. A target region is a region formed by one or more pixels, and, for example, a region in which a desired object to set in focus appears can be set as the target region. Details of the setting of a target region will be described later with reference to the flowchart of FIG. 6. An evaluation value calculation unit 113 obtains, from the AD converter 108 or the signal processing unit 109, RGB pixel values or a luminance value of a target region. Next, the evaluation value calculation unit 113 calculates a focus evaluation value that uses autofocus (AF) control. In this embodiment, it will be assumed that a focus evaluation value is an evaluation value related to a contrast of a specific frequency. However the present invention is not particularly limited to this, and a focus evaluation value may be a value that indicates, for example, distance information due to a phase difference or the like.

The tilt control unit 114 instructs, based on an instruction from the communication unit 110, a target position of tilt control to a tilt driving unit 115. In this embodiment, a target position of tilt control is represented by a rotation angle from a basic posture of the image capturing element 106 or the image capturing optical system. Also, assume that a tilt angle refers to a control amount (rotation angle) of tilt control performed from a basic posture of the image capturing element 106 to a given posture. In this embodiment, it will be assumed in the following description that the basic posture of a principal plane of the image capturing optical system is parallel to the basic posture of the image capturing element 106.

Tilt control according to this embodiment is control in which a plane of focus, which is where the focus is set, is tilted by tilting an image capturing plane with respect to a plane perpendicular to an optical axis on which image capturing of an object is performed. In this embodiment, tilt control is performed by rotating the image capturing element 106 or the image capturing optical system, allowing the focus to be set on the ground or the entire object on a plane such as a building or the like. Tilt control is performed by, for example, a user operating an input device such as a button or a dial.

The tilt driving unit 115 will tilt the image capturing element 106 or the image capturing optical system based on the target position instructed from the tilt control unit 114. Assume that the tilt driving unit 115 will tilt the image capturing element 106, and this operation will be simply referred to as "tilt control" hereinafter. In addition, in this embodiment, it will be assumed that the tilt driving unit 115 will execute control by using, as a rotation axis, a center axis at the center of the image capturing element 106 as shown in FIG. 2 or 3 (to be described later). However, the rotation axis is not limited to this position. Note that in this example, it will be assumed that the center axis of the image capturing element is an axis connecting the midpoints of two short sides of the image capturing element. Note that in the following description, assume that tilt control will be performed within the range of −90° to +90° from the basic posture.

Note that although it will be described in this embodiment that tilt control is performed by rotating the image capturing element 106 as described above, tilt control may also be performed by rotating the image capturing optical system. In such a case, the relationship between the positions and the postures of the image capturing element 106 and the image capturing optical system will be similar to that of a case in which the image capturing element 106 has been rotated, in a direction opposite to the rotation direction of the image capturing optical system, by the same rotation width about the rotation axis of the image capturing optical system as the center of the rotation. Hence, a focus correction value will also be calculated in a manner similar to such a case by using a method to be described below.

When tilt control is to be performed, a correction amount calculation unit 116 will determine a correction amount (focus correction amount) of focus correction to be performed by the focus control unit 117. A focus correction amount according to this embodiment is a correction amount used in focus correction performed to maintain focus, in accordance with the tilt control, in a target region set by the region setting unit 112. Although a focus correction amount will be calculated based on a control amount of the tilt control here, a detailed description thereof will be given later with reference to FIG. 4. The focus control unit 117 designates a focus position to a focus driving unit 118 based on a calculated focus correction amount or an instruction from the communication unit 110. The focus driving unit 118 controls the position of the focus lens 102 based on the focus position instructed by the focus control unit 117. In addition, in a case in which the user has instructed to stop the tilt control, the correction amount calculation unit 116 may recalculate the correction amount by setting, as the target position, the position (the posture at the point of time at which the image capturing element is stopped) corresponding to the stop instruction.

[Tilt Control]

Figure 2A:
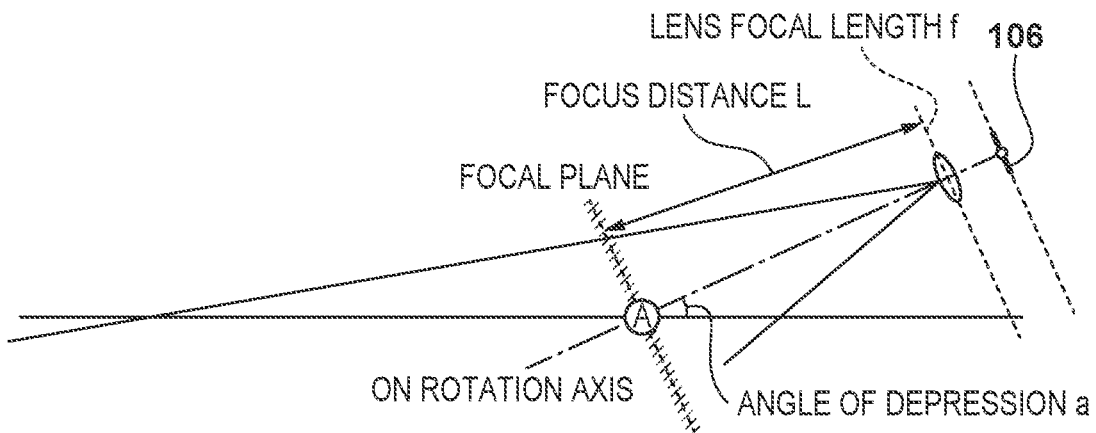
FIGS. 2A and 2B are views each showing an example of focus position correction in tilt control according to the first embodiment.

Focus position correction corresponding to tilt control performed by the information processing apparatus according to this embodiment will be described hereinafter with reference to FIGS. 2A and 2B and FIGS. 3A to 3C. FIG. 2A is a schematic view showing an example of a state before tilt control in which the focus is on a point A on an object on the optical axis. In the example of FIG. 2A, the focus has been adjusted so that the focus will be on an object distance L to the point A. In addition, since the principal plane of the optical system and the image capturing element are arranged in parallel, the planes of the optical system and the image capturing element will be parallel to the plane of focus. In addition, the point A is present on the rotation axis of the plane of focus (to be described later). Note that "set focus on" refers to capturing the object within the range of the depth of field which is determined in accordance with the setting of a permissible circle of confusion of the image capturing optical system. Although focus adjustment will basically be performed by AF in this embodiment, a description thereof will be omitted since it is processing that is generally known.

Figure 2B:
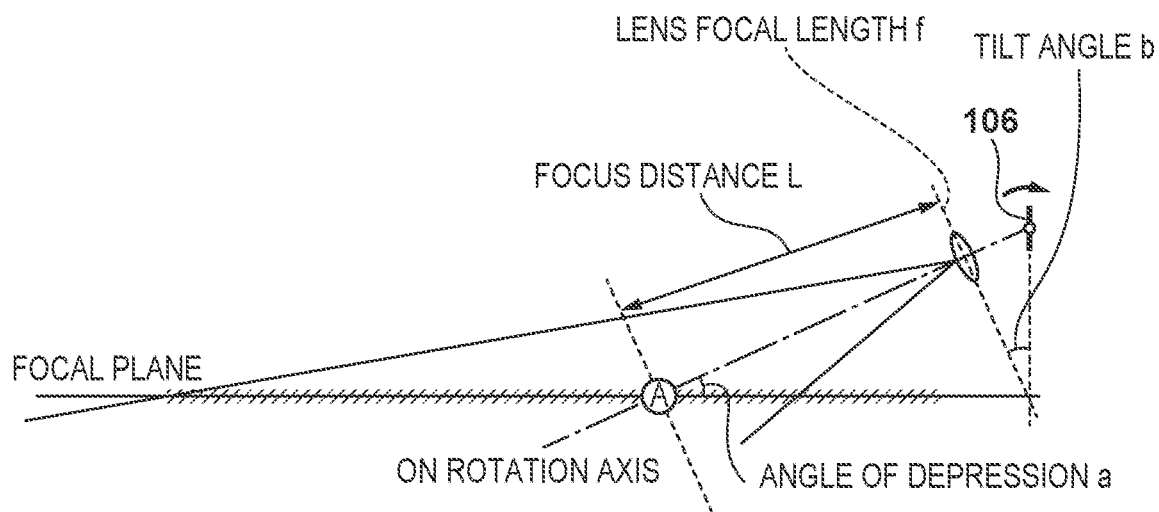

FIG. 2B is a schematic view showing an example of a state after tilt control about the center axis, as the rotation axis, of the image capturing element. When the tilt control is performed, the plane of focus also rotates based on the Scheimpflug principle. Hence, performing tilt control will allow the focus to be set on the entire range, from a close distance to a far distance, of the object on a given plane. Note that at this time, the plane of focus will rotate about a position corresponding to the tilt rotation axis (the rotation axis of the image capturing element) as the axis. In this embodiment, an axis corresponding to the tilt rotation axis of the plane of focus is a line, on the plane of focus, which is set at a position corresponding to the object image on the tilt rotation axis of the image capturing element. In FIG. 2B, the plane of focus is rotated by tilt control so that the plane of focus will match the entire surface of the object on the plane. Although a detailed description will be omitted since the Scheimpflug principle is a known principle, it is a principle in which when the principal plane of an optical system and an image capturing plane of an image capturing element meet on a given single line, the plane of focus will meet on the same line as this line. Letting f be a focal length, L be the object distance, and α be an angle of depression, a tilt angle b will be represented based on the Scheimpflug principle as follows.

$$b = \tan^{-1}\left(\frac{f}{L\tan\alpha}\right) \quad (1)$$

Note that in a case in which tilt control is to be performed in a direction opposite to that in the example shown in FIGS. 2A and 2B, the depth of field will become shallow because the plane of focus will also rotate in the opposite direction. Hence, it will be possible to make points other than the point A on the object more blurred.

Figure 3A:
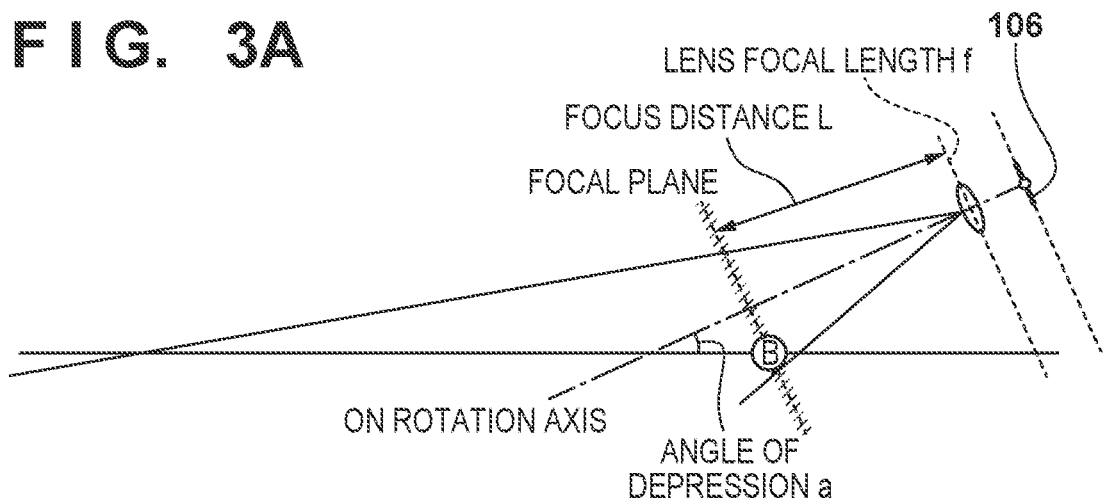
FIGS. 3A to 3C are views each showing an example of the focus position correction in the tilt control according to the first embodiment.

FIG. 3A is a schematic view showing another example of a state before tilt control in which the focus is set on a point B on an object which is not on the optical axis. In the example of FIG. 3A, the focus is adjusted so that the focus will be set on the object distance L to the point B. In addition, since the principal plane of the image capturing optical system and the image capturing element are arranged in parallel, the planes of the image capturing optical system and the image capturing element are parallel to the plane of focus. In addition, the rotation axis of the plane of focus corresponding to the tilt control passes the point A of FIGS. 2A and 2B, and the point B falls outside of the rotation axis. Since the plane of focus will rotate about a position corresponding to the rotation axis of the image capturing element 106 as the rotation axis if tilt control is performed in a manner similar to the examples of FIGS. 2A and 2B, the point B of the object, which is not on the rotation axis of the plane of focus, will be blurred by falling outside the plane of focus.

Figure 3B:
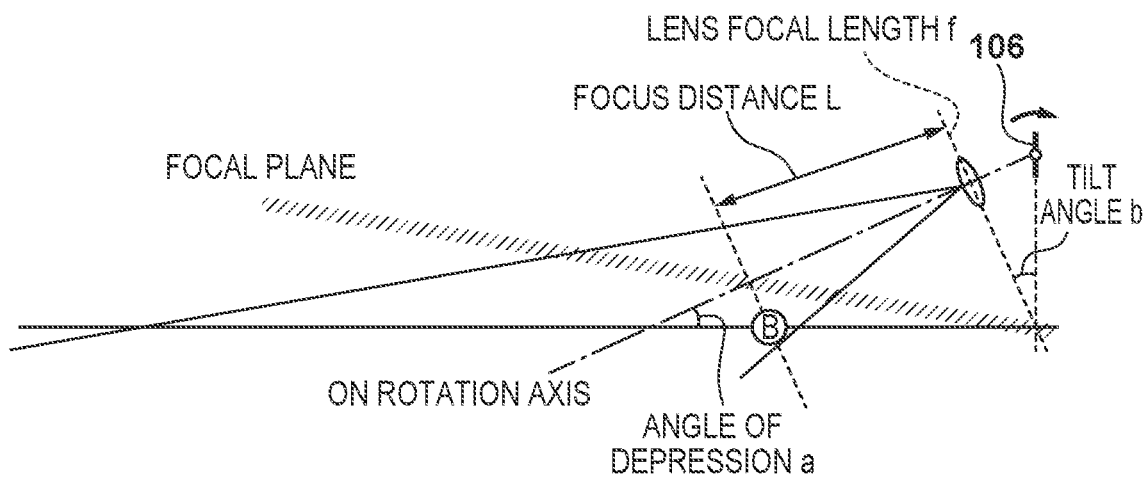
Figure 3C:
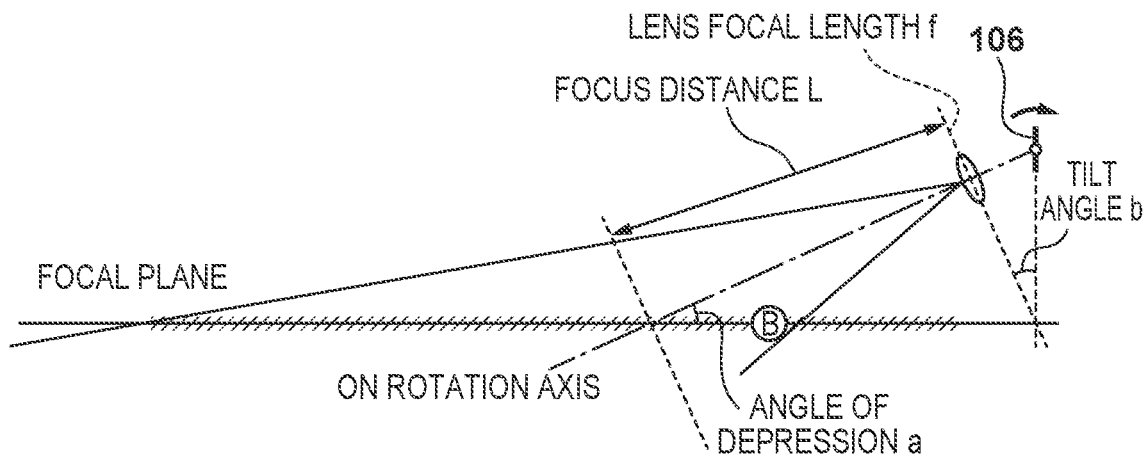

FIG. 3B is a schematic view showing an example of a state after tilt control has been performed in a manner similar to FIG. 2B. As described above, the point B is out of focus in this example, and it is preferable to execute focus correction to prevent blurring of this point B. FIG. 3C is a schematic view of a case in which such focus correction is performed by the information processing apparatus 100 according to this embodiment. The example of FIG. 3C shows a state in which focus is set on the point B is maintained by focus correction while the plane of focus is rotated.

Figure 4:
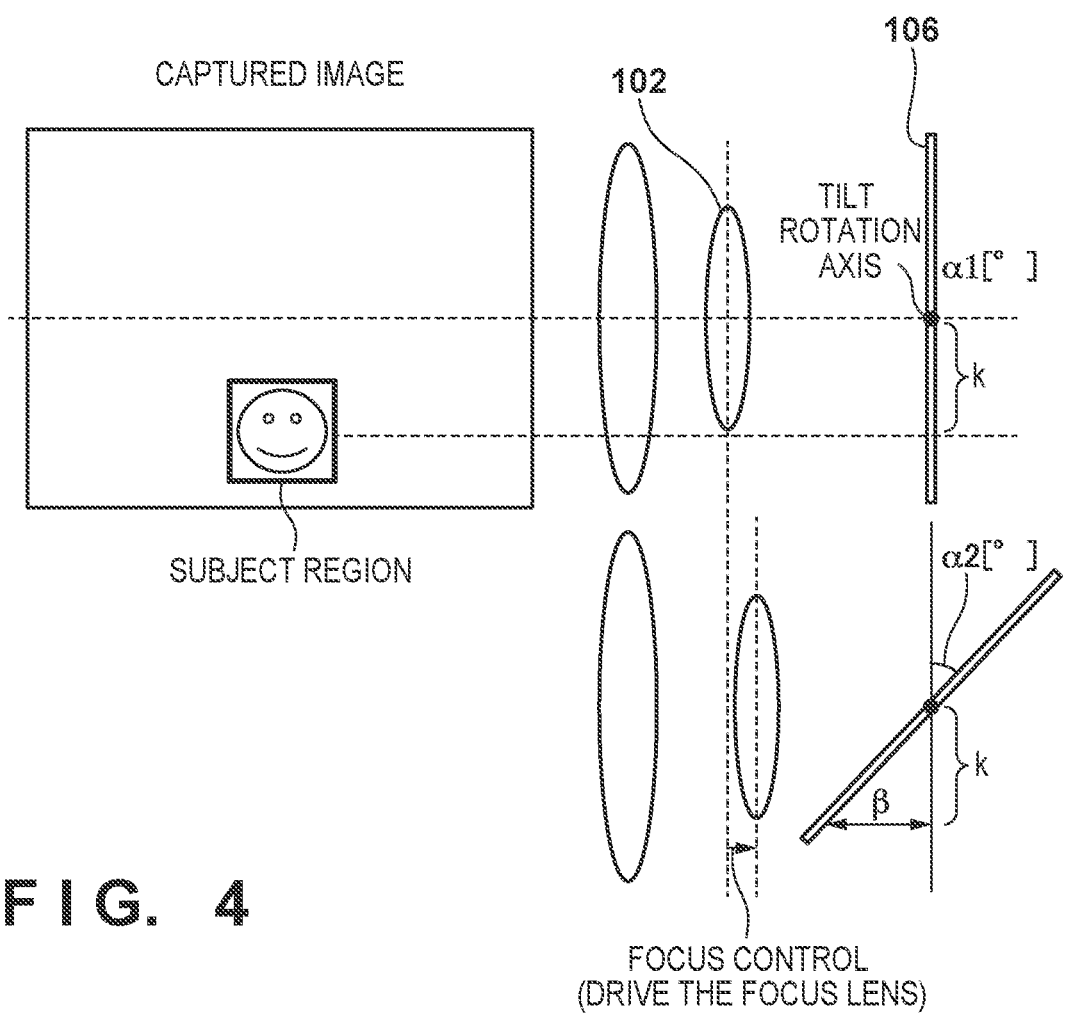
FIG. 4 is a view for explaining calculation of focus position correction amount according to the first embodiment.

An example in which a focus correction amount for correcting a focus position in accordance with the tilt control is calculated will be described hereinafter with reference to FIG. 4. In FIG. 4, the region setting unit 112 sets a target region in a captured image. In this example, the region setting unit 112 sets, as the target region, a region expressing an object present in a portion lower than the tilt rotation axis in the captured image. Next, the correction amount calculation unit 116 calculates the focus correction amount which will set the focus on the target region in accordance with the control amount of the tilt control. Here, a focus correction amount β is calculated as follows.

$$\beta = (\tan \alpha 2 - \tan \alpha 1) \times k \quad (2)$$

In the above equation, the image capturing element 106 is controlled to be rotated from a tilt angle α1 to a tilt angle α2 by the tilt control, and k is a distance from a rotation axis on the image capturing element 106 to a central pixel of the object.

Figure 5:
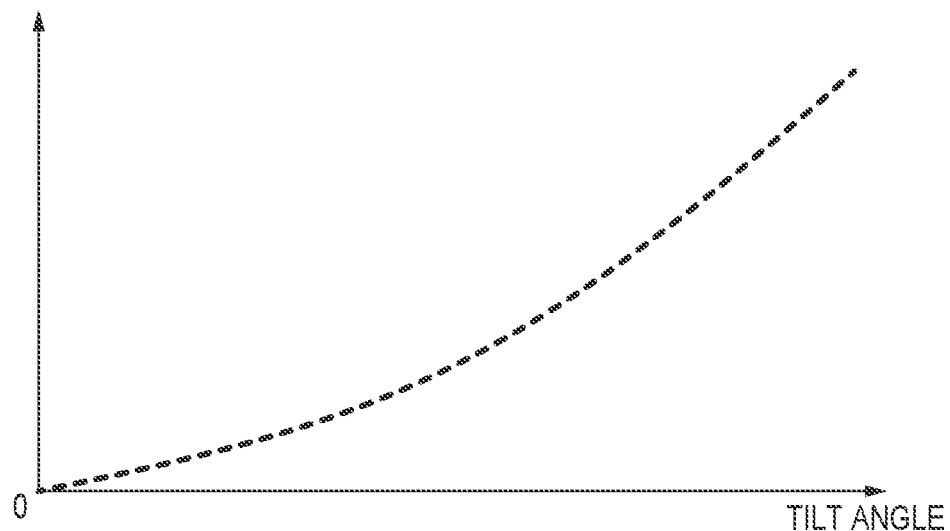
FIG. 5 is a graph showing an example of the relationship between a tilt angle and a focus correction amount according to the first embodiment.

FIG. 5 is a graph expressing the relationship between the tilt angle and the focus correction amount β. In this example, the graph is not linear and the amount of change of the focus correction amount changes in accordance with the among of control on the basic posture even when tilt control is performed at the same amount. Since the tilt control of the image capturing element 106 is performed in the range of −90° to +90° from the basic posture, the focus correction amount corresponding to the control amount will increase as the absolute value of the control amount from the basic posture increases.

Note that the calculation method of the focus correction amount is not particularly limited to equation (2). For example, the correction amount calculation unit 116 may calculate a simple correction amount by dividing the focus correction amount β of equation (2) by the sensitivity of the focus lens, and may calculate a more accurate correction amount by solving a higher-order equation or a polynomial corresponding to the sensitivity.

Figure 6:
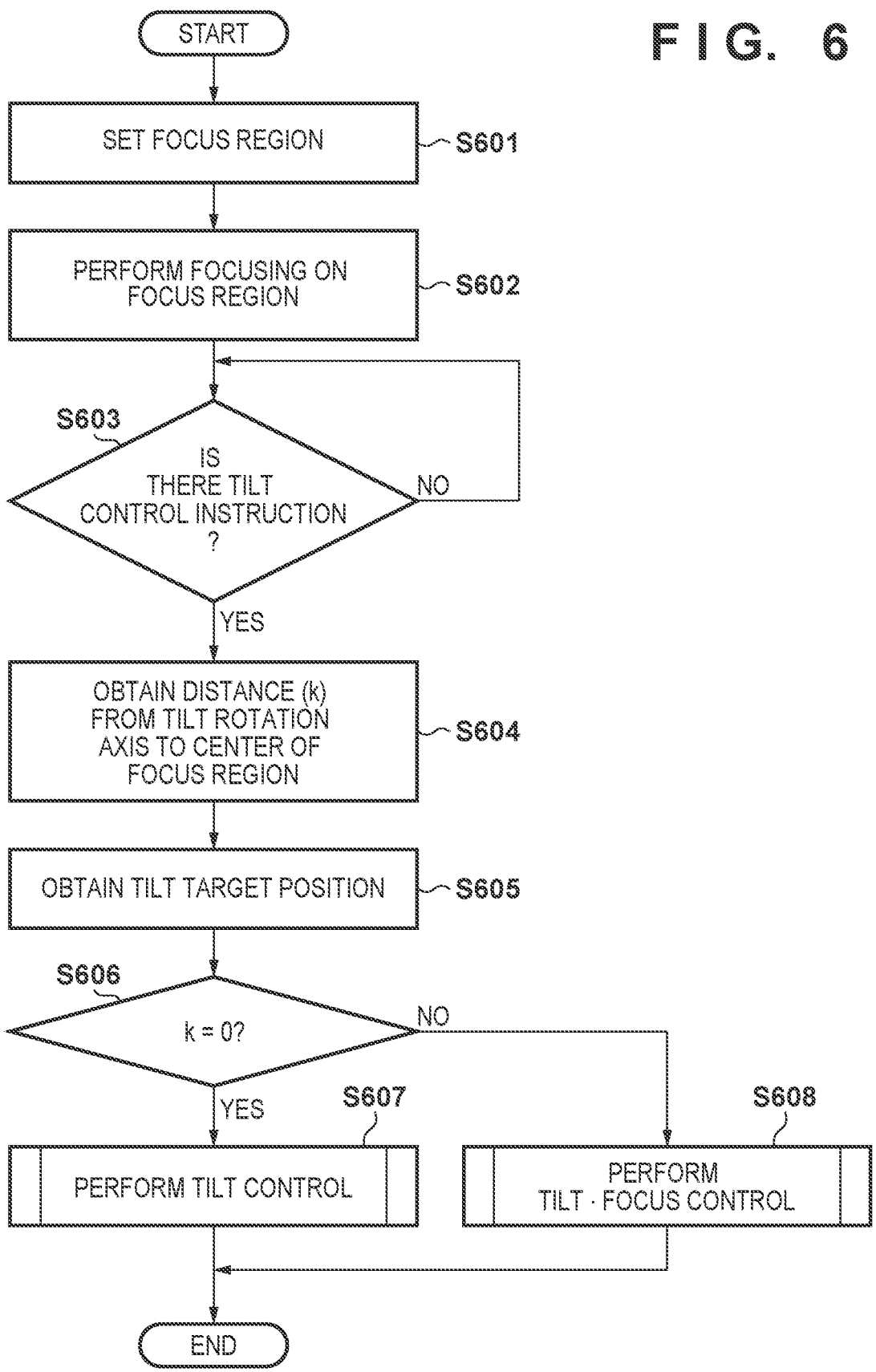
FIG. 6 is a flowchart of an example of processing of an information processing method according to the first embodiment.

Processing to be performed by the information processing apparatus 100 according to this embodiment will be described hereinafter with reference to FIG. 6. FIG. 6 is a flowchart showing an example of main processing performed by the information processing apparatus 100.

In step S601, the region setting unit 112 sets a target region. In this embodiment, the region setting unit 112 sets, as the target region, an arbitrary region designated by the user. In addition, the region setting unit 112 may automatically set a position, detected by a function for detecting a specific target object, as the target region. For example, the region setting unit 112 may use an AF function to set the focus on a detected object, and set a region indicating this object as the target region.

In step S602, the focus driving unit 118 performs focusing on the target region. The focus driving unit 118 may automatically perform focusing by, for example, an AF function. In addition, for example, the focus driving unit 118 may also use a manual focus (MF) function to perform focusing in accordance with the manual input by the user who is viewing a captured image. In this case, the focus driving unit 118 may display assistive information to the user by enlarging the display of the target region to facilitate the viewing of the user, present the degree of focus on the target region, and the like.

In step S603, the tilt control unit 114 determines whether the user has issued a tilt control instruction. If the user has issued a tilt control instruction, the process will advance to step S604. Otherwise, whether the user has issued a tilt control is confirmed again.

In step S604, the correction amount calculation unit 116 calculates the distance from the rotation axis in the object image by the image capturing element to the target region. In this embodiment, the correction amount calculation unit 116 calculates the distance from the rotation axis to the central pixel of the target region. In step S605, the tilt control unit 114 obtains the target position of the tilt control set in the instruction confirmed in step S603. Only one point may be designated as the target position for tilt control. For example, a range of tolerance of −1° to +1° may be set, and a point that falls within this range may be determined to be the target position. In step S606, the correction amount calculation unit 116 determines whether a value of the distance to the object from the rotation axis on the image capturing element 106 (a value of the distance to a position of the target region from a positon corresponding to a position of the rotation axis in the image or a value of the distance to a position of the target region from a positon corresponding to a positon corresponding to a position of the rotation axis in the image) is 0. If it is determined that the value is 0, the process will advance to step S607 upon determining that focus control is not needed because the focus on the target region will not shift even if tilt control is performed. Otherwise, the process will advance to step S608 upon determining that focus control is needed. Tilt control will be performed in step S607, and tilt control and focus control will be performed in step S608. After the process of step S607 or step S608, the processing ends.

Figure 7:
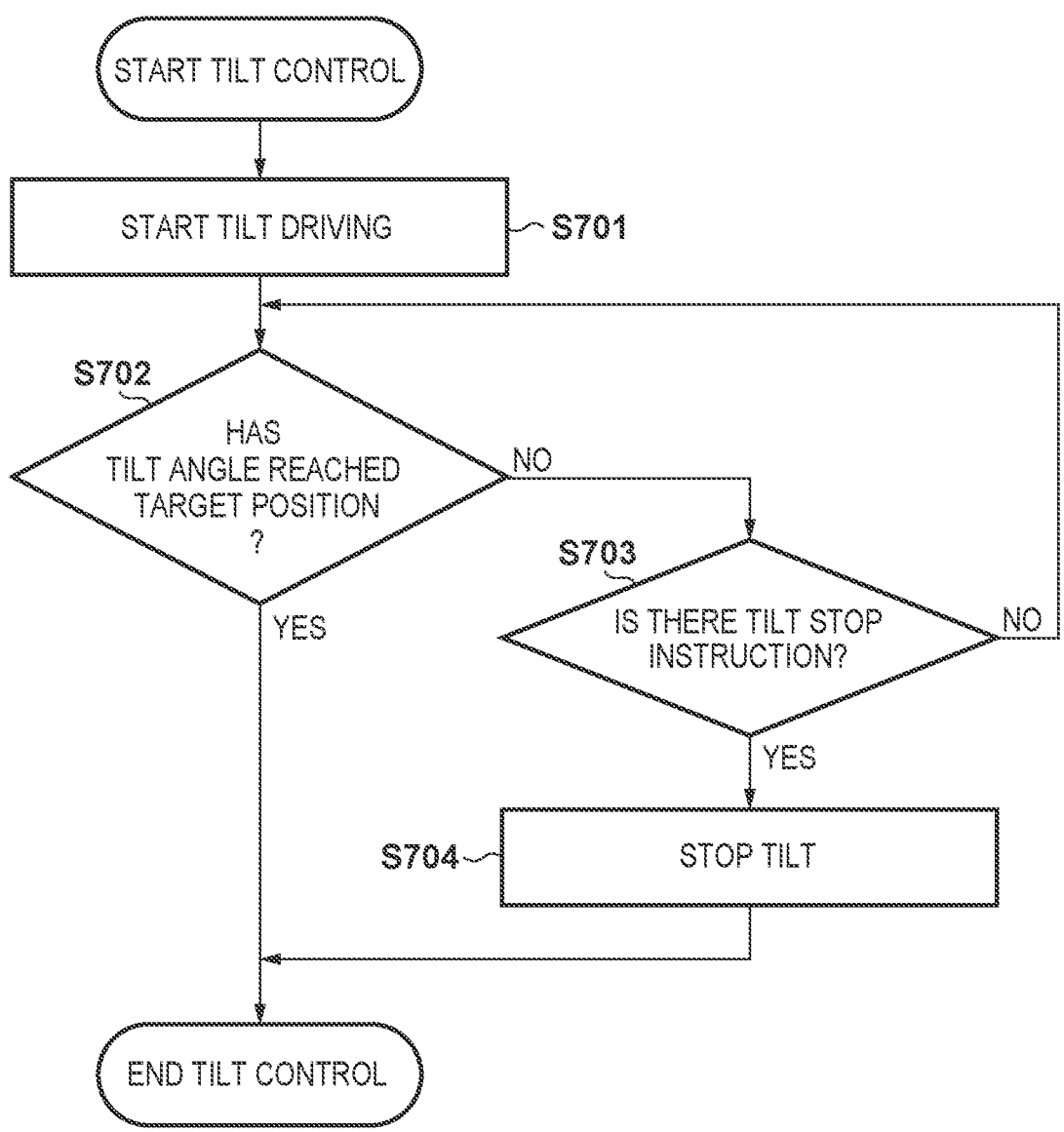
FIG. 7 is a flowchart of an example of processing of the tilt control according to the first embodiment.

The processing of step S607 and that of step S608 will be described hereinafter with reference to FIGS. 7 and 8, respectively, hereinafter. FIG. 7 is a flowchart showing an example of detailed processing of the tilt control to be performed in step S607.

In step S701, the tilt driving unit 115 starts the tilt control toward the target position of the tilt control obtained in step S605. In step S702, the tilt driving unit 115 determines whether the tilt angle has reached the target position at this point of time. If the tilt angle has reached the target position, the processing ends. Otherwise, the process advances to step S703.

In step S703, the tilt control unit 114 determines whether the user has issued a stop instruction during the tilt driving operation. If the stop instruction has been issued, the process advances to step S704. Otherwise, the process advances to step S702. In step S704, the tilt driving unit 115 stops the tilt driving operation in the position corresponding to the stop instruction, and the processing ends.

Figure 8:
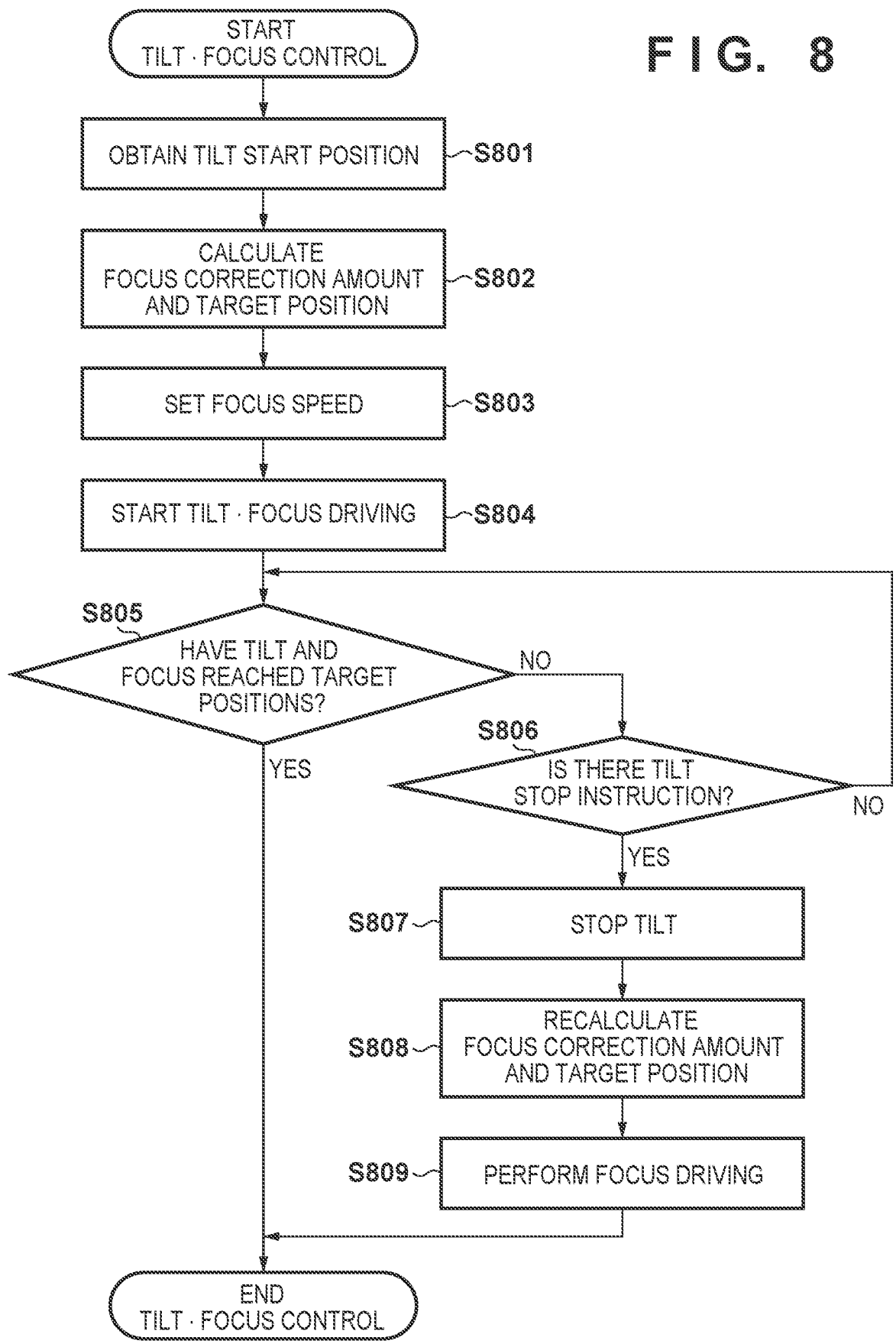
FIG. 8 is a flowchart of an example of processing including focus correction according to the first embodiment.

FIG. 8 is a flowchart showing an example of the detailed processing of the tilt control and the focus control to be performed in step S608. In step S801, the tilt control unit 114 obtains the current tilt angle as a tilt start position. In step S802, the correction amount calculation unit 116 calculates a correction amount to be executed in accordance with the tilt control and the focus target position corresponding to the correction amount. In this embodiment, the correction amount is calculated by equation (2) described above.

In step S803, the correction amount calculation unit 116 sets a focus driving speed for performing focus correction. In this embodiment, the focus driving speed points to a speed for controlling the position of the focus lens to execute focus correction. The correction amount calculation unit 116 may set the focus driving speed in accordance with the control speed of the tilt control driving operation determined in advance. The effect maintaining of focus on a focus region during the tilt driving operation will degrade if the driving of the tilt control and the driving of the focus control are not synchronized. From this point of view, the correction amount calculation unit 116 according to this embodiment will set the focus driving speed so that the focus driving time will be equal to the total driving time of tilt control. That is, the correction amount calculation unit 116 will set the focus driving speed so that the correction of the focus position will be completed simultaneously with the completion of the tilt control. The driving time of the tilt control is calculated by, for example, dividing the tilt driving amount (a difference between the tilt start position and the tilt target position) by the tilt driving speed (°/sec).

In this embodiment, the tilt driving unit 115 performs tilt control at a predetermined speed. Since the focus correction amount corresponding to the tilt control amount increases as the absolute value of the tilt control amount from the basic posture increases, the correction amount calculation unit 116 may set the focus driving speed to increase as the absolute value of the tilt angle increases within range of 0° to 90°. In addition, the correction calculation unit may set the focus driving speed during the tilt driving operation in accordance with the value of the absolute value of the tilt angle before the tilt control is performed.

In step S804, the tilt driving unit 115 starts tilt driving toward the target position obtained in step S605, and the focus driving unit 118 starts controlling the position of the focus lens toward the focus target position calculated in step S802. In step S805, the tilt driving unit 115 and the focus driving unit 118 determine whether the tilt angle and the focus position have reached their respective target positions. If both the tilt angle and the focus position have reached their respective target positions, the processing ends. Otherwise, the process advances to step S806.

In step S806, the tilt control unit 114 determines whether the user has issued a stop instruction during the tilt driving operation. If the stop instruction has been issued, the process advances to step S807. Otherwise, the process returns to step S805. In step S807, the tilt driving unit 115 stops the tilt driving operation in a position corresponding to the stop instruction.

In step S808, the focus control unit 117 recalculates, by setting the position corresponding to the tilt driving stop instruction as the target position, the focus correction amount and the focus target position corresponding to this focus correction amount. In step S809, the focus driving unit 118 controls the position of the focus lens in accordance with the recalculated focus target position.

According to such processing, it will be possible to calculate a correction amount corresponding to the position of the target position in accordance with the tilt control, and correct the focus position by using this correction amount. Hence, it will be possible to use a simple hardware arrangement with a fixed tilt control rotation axis to change the depth of field by performing tilt control while maintaining focus on an arbitrary region in an image capturing region. In addition, by setting so that the driving time of the tilt control will be equal to the driving time of the focus control, it will be possible to maintain focus on the target region in one tilt driving operation.

Second Embodiment

An information processing apparatus according to the first embodiment sets focus control so that tilt control and focus control will have equal driving time. That is, it was set so that one focus control operation will be performed with respect to one tilt control operation. On the other hand, an information processing apparatus according to this embodiment will repeatedly perform calculation of a focus correction amount and correction of a focus position over a plurality of times during one tilt control operation. By performing correction a plurality of times, it will be possible to repeatedly control the focus position to be in an optimal state each time. Note that the arrangement and the processing of the information processing apparatus according to this embodiment are similar to the processes, excluding the process shown in step S608 (processing of FIG. 8), shown in FIGS. 1 and 6 of the first embodiment, and a redundant description thereof will be omitted.

Figure 9:
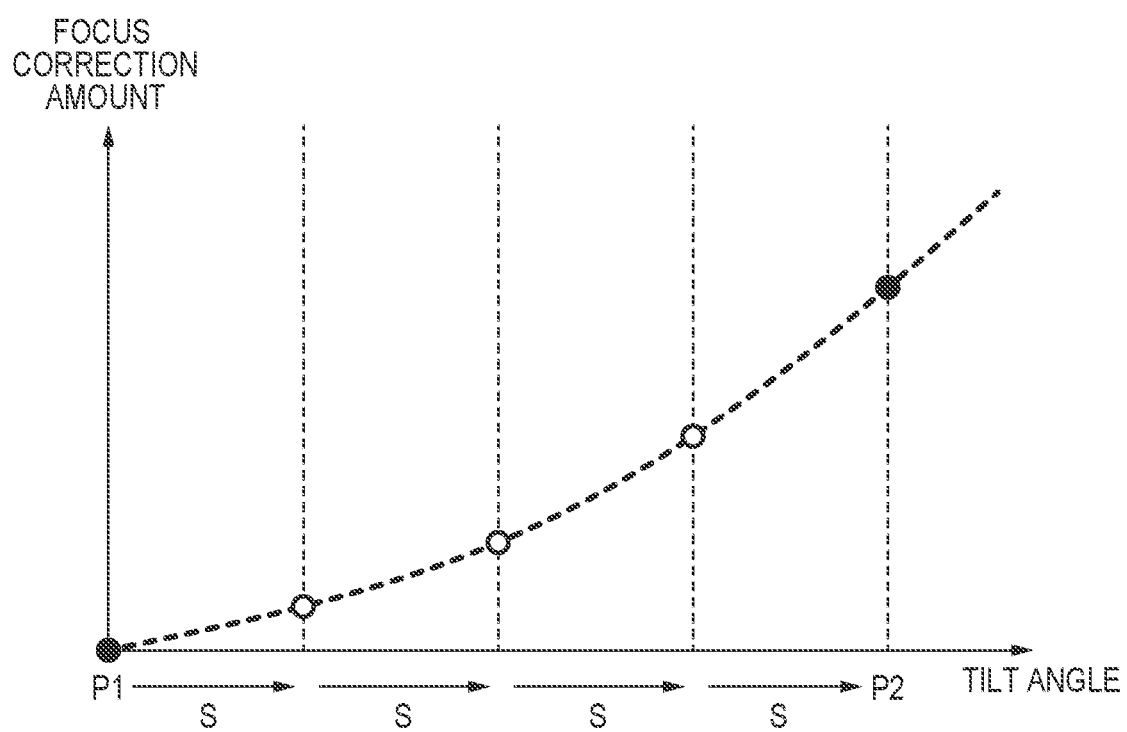
FIG. 9 is a graph showing an example of the relationship between a tilt angle and a focus correction amount according to the second embodiment.

Processing to be performed by the information processing apparatus according to this embodiment will be described hereinafter with reference to FIGS. 9 and 10. In this embodiment, a predetermined tilt angle control amount S will be set as one step, and focus position correction will be performed by recalculating the focus correction amount for each step. FIG. 9 is a graph obtained by drawing auxiliary lines on the graph expressing the relationship between the tilt angle and a focus correction amount β, shown in FIG. 5, to allow the focus correction amount for each tilt angle control amount S to be easily referred.

In the example of FIG. 9, reference symbol P1 indicates a start position of tilt control and reference symbol P2 indicates each target position of the tilt control, and a focus correction amount for each control amount S between the start position and each target position is shown. In this embodiment, a focus correction amount as shown in FIG. 9 is calculated for each control amount S, and the focus position is corrected each time. Note that although it is assumed that a focus driving speed during one focus correction operation will be constant here, the focus driving speed may be finely adjusted as needed. In addition, although each focus correction amount will be calculated according to equation (2) in this embodiment, a format in which table data, coefficients, or the like for obtaining the focus correction amount are stored and correction is performed by referring to these table data, coefficients, or the like may also be employed. In addition, although the control amount S is set so that the tilt angle will reach the target position exactly from the start position by the driving operation for each step in this embodiment, the present invention is not particularly limited to this. For example, it may be arranged so that a focus correction amount will be calculated for each control amount S until the control to be performed immediately before arrival at the target position, and the focus correction amount for only the final control operation will be calculated by setting the control amount to be from the tilt angle at that point to the target position.

Figure 10:
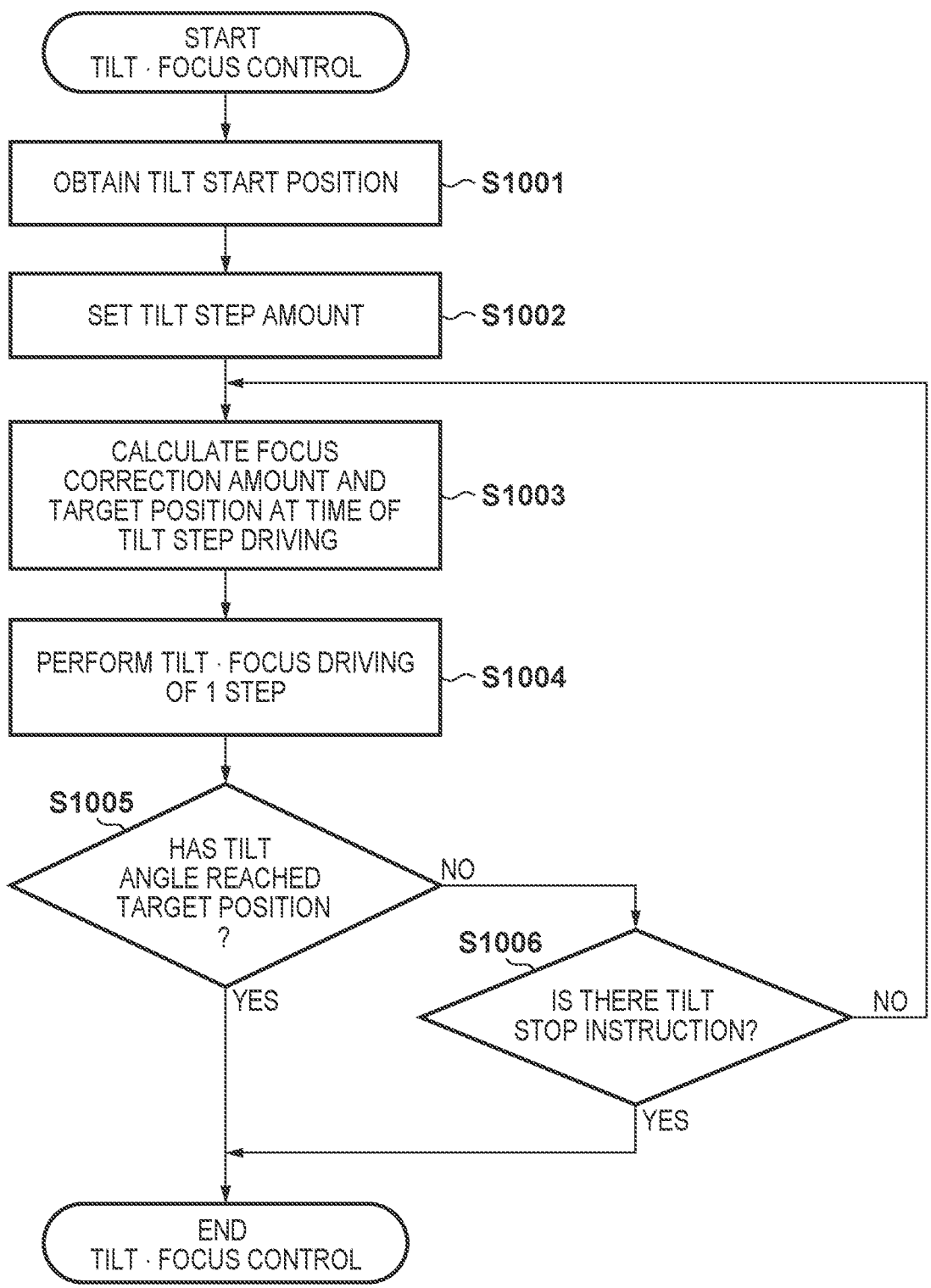
FIG. 10 is a flowchart of an example of processing including focus correction according to the second embodiment.

FIG. 10 is a flowchart showing an example of detailed processing of tilt control and focus control to be performed in step S608 by the information processing apparatus according to this embodiment. In step S1001, a tilt control unit 114 obtains the current tilt angle as the tilt start position. In step S1002, the tilt control unit 114 sets the control amount S for one step of tilt control. The value of the control amount S is set to a desired value by a user. The focus maintaining effect during tilt control increases as the value of the control amount decreases, and the time required for tilt control decreases as the value of the control amount increases.

In step S1003, a correction amount calculation unit 116 calculates a focus correction amount corresponding to one step. In this example, the correction amount calculation unit 116 calculates the focus correction amount based on the tilt angle at this point of time and the control amount S of one step. In step S1004, a tilt driving unit 115 and a focus driving unit 118 perform a tilt driving operation and a focus driving operation of one step. After both the tilt driving operation and the focus driving operation of one step have been completed, the process advances to step S1005.

In step S1005, the tilt control unit 114 determines whether the tilt angle has reached a target position set in step S608. If it is determined that the tilt angle has reached the target position, the processing ends. Otherwise, the process advances to step S1006. In step S1006, the tilt control unit 114 determines whether the user has issued a stop instruction during the tilt driving operation. If the stop instruction has been issued, the tilt driving unit 115 stops the tilt driving operation in a position corresponding to the stop instruction and ends the processing. Otherwise, it will be determined that the tilt driving operation and the focus driving operation of the next step are to be performed, and the process returns to step S1003.

According to this processing, it is possible to perform two or more focus correction operations with respect to one tilt control operation. Hence, by sequentially performing control to set the focus position in an optimal state each time a focus correction operation is repeated, the effect of maintaining the focus on a target region can be improved.

Third Embodiment

An information processing apparatus according to this embodiment automatically adjusts a focus position by performing tilt control and focus control so as to set focus on two target regions in an object image. An information processing apparatus 100 can automatically adjust the focus position to set focus on two objects which are at different distances from the information processing apparatus 100. Since the information processing apparatus 100 according to this embodiment has the same arrangement as that shown in FIG. 1 of the first embodiment and can perform similar processing, a redundant description will be omitted.

Figure 12:
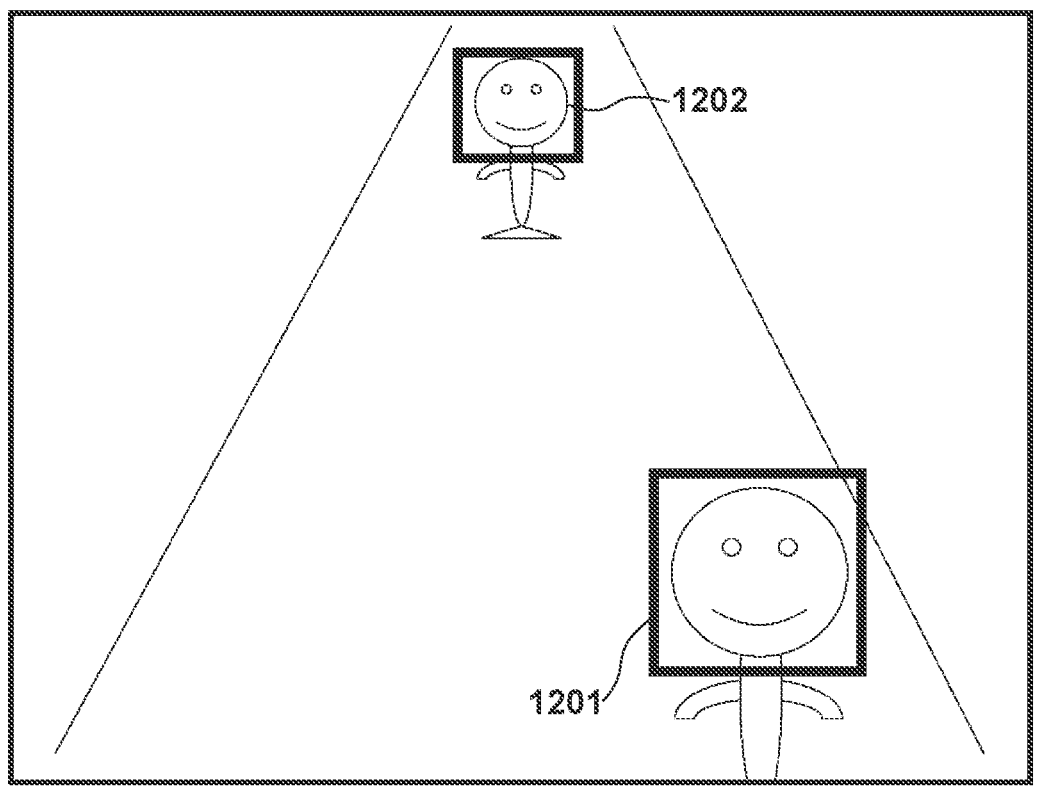
FIG. 12 is a view showing an example of a captured image in which two objects appear according to the third embodiment.

Processing performed by the information processing apparatus 100 according to this embodiment will be described hereinafter with reference to FIGS. 12 and 13. FIG. 12 shows an example of an image captured by the information processing apparatus according to this embodiment. In this example, an object 1201 is positioned at a distance closer to the information processing apparatus 100 than an object 1202. In a case in which there is a difference between the distances to two objects, the depth of field may become insufficient and the focus may not be set to both objects by performing a normal image capturing operation. Hence, a tilt control unit 114 according to this embodiment will decide a control amount of tilt control so as to set focus on both of the objects 1201 and 1202 by correcting the focus position. That is, the information processing apparatus according to this embodiment will decide a tilt control amount and a focus correction amount so that both objects can be set on the plane of focus by performing tilt control and focus control in a manner similar to the first embodiment.

A region setting unit 112 according to this embodiment sets, in a manner similar to the first embodiment, two target regions in an object image on an image capturing element. Here, a focus driving unit 118 can first preferentially set focus on one of the two target regions based on focus evaluation results calculated from the respective target regions by an evaluation value calculation unit 113. The focus driving unit 118 may set the focus on, for example, a target region which has a higher degree of priority, which is set for each target region, or may set the focus on a target region selected based on the focus evaluation value before focusing is performed, and the method of selecting the target region to set focus on is not particularly limited. The degree of priority set for each target region may be set by inputs by user selection or the like. This degree of priority may also be set in accordance with the type of the detection target (for example, set so that focus will be preferentially set on a specific object or the like). The degree of priority may also be set in accordance with a predetermined condition such as a condition to set a higher degree of priority to a target region where an object which is closer to the information processing apparatus 100 appears or the like. For the sake of descriptive convenience hereinafter, assume that the objects 1201 and 1202 of FIG. 12 will be used as the objects of the two target regions to be set by the region setting unit 112, and that focus will be set preferentially on the object 1201.

The tilt control unit 114 decides, while maintaining the focus on the object 1201, a target position of tilt control which will allow focus to be set on the object 1202 by performing tilt control and focus control in a manner similar to the first embodiment. The tilt control unit 114 may detect, for example, based on the focus evaluation value of a region on the object 1202 during tilt control (and the accompanying focus correction for maintaining focus on the object 1201), the target position of tilt control for setting the focus on the object 1202. The tilt control unit 114 may also calculate a common tilt control position where the focus lens position of a case in which tilt control is performed by maintaining focus on the object 1201 and the focus lens position of a case in which tilt control is performed by maintaining the focus after setting the focus on the object 1202 first will match. In this case, the above-described common control position can be calculated by, for example, using equation (2).

Note that in a case in which a distance k from the rotation axis in the object image by the image capturing sensor to the object 1201 is zero, the state of focus on the object 1201 will not be changed by tilt control. Hence, in a case in which k is zero, a correction amount calculation unit 116 can calculate, without considering the focus on the object 1201, the focus correction amount of an arbitrary position of the object 1202 to undergo tilt control in a manner similar to the first embodiment. In addition, since it can be considered that a change in the state of focus on the object 1201 due to tilt control will be minimal enough to be ignored when k is close to zero, a predetermined range can be set around zero, and the value of k may be determined to be zero if it falls within this range (for example, a range of −0.5 or more to +0.5 or less).

Figure 13:
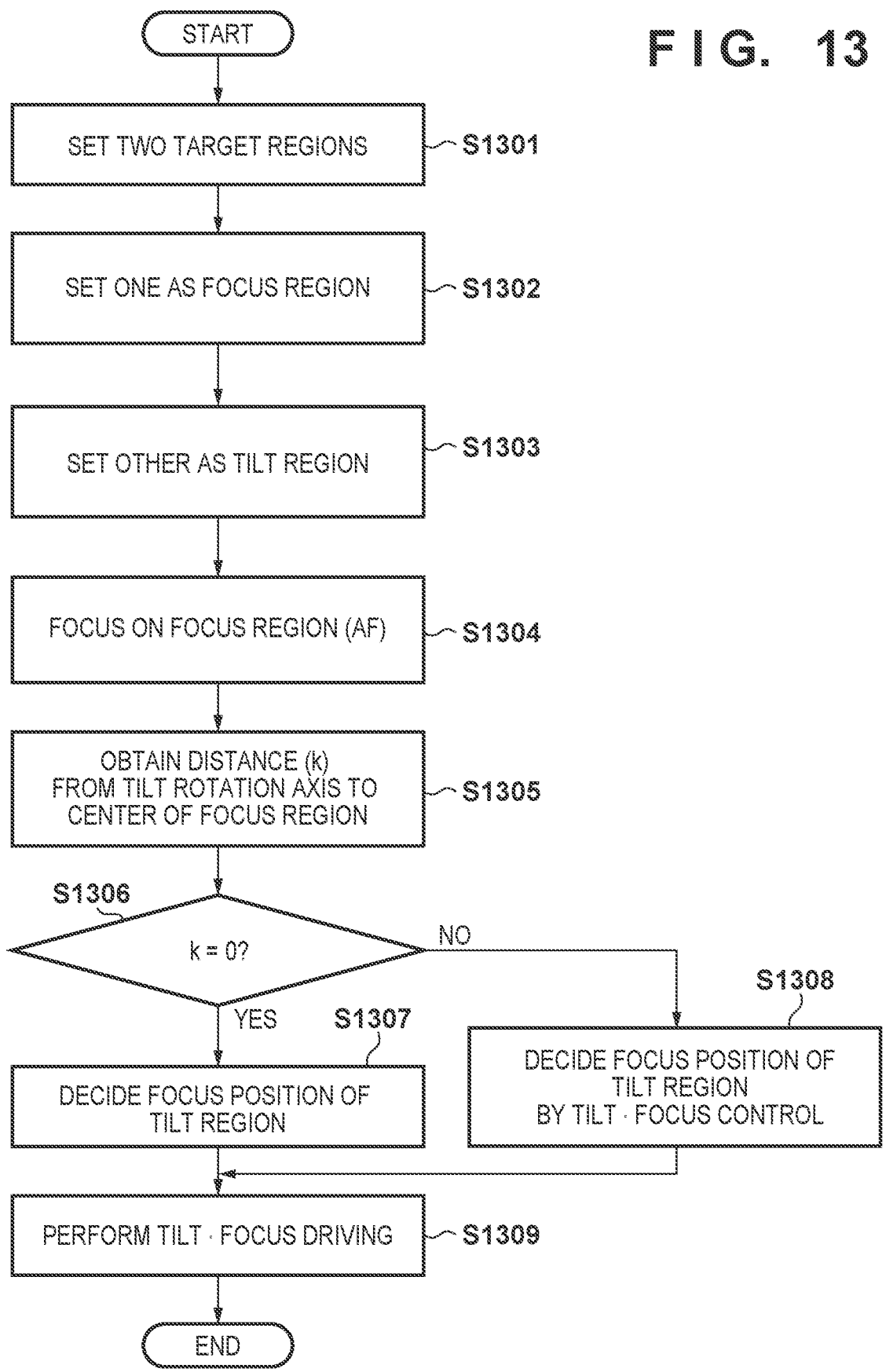
FIG. 13 is a flowchart of an example of processing of an information processing method according to the third embodiment.

FIG. 13 is a flowchart showing an example of processing performed by the information processing apparatus according to this embodiment. In step S1301, the region setting unit 112 sets two target regions in an object image on the image capturing element. In step S1302, the region setting unit 112 sets one of the two target regions to be a region (to be referred to as a focus region hereinafter) to which focus is to be set preferentially. In step S1303, the region setting unit 112 sets the region which was not set in step S1302 as the focus region as a region (to be referred to a tilt region hereinafter) to set focus on by tilt control.

In step S1304, the tilt control unit 114 adjusts the focus based on the focus evaluation value of the focus region. Focus is set on the focus region here by an AF function.

In step S1305, the correction amount calculation unit 116 calculates the distance k from the rotation axis in the object image by the image capturing element to the focus region. If it is determined that k is 0, the process advances to step S1307. Otherwise, the process advances to step S1308.

In step S1307, the correction amount calculation unit 116 calculates the focus correction amount of the position which is to undergo tilt control. The tilt control position may be decided based on, for example, an image or based on an operation by the user. After step S1307, the process advances to step S1309.

In step S1308, the tilt control unit 114 decides a tilt control target position so that focus will be set on the tilt region by performing tilt control and focus control similar to the first embodiment while maintaining focus on the focus region. After step S1308, the process advances to step S1309.

In step S1309, a tilt driving unit 115 and the focus driving unit 118 will perform driving operations based on the tilt control position decided in step S1307 or step S1308 and the focus lens position decided in accordance with the tilt control position. Subsequently, the processing ends.

According to this processing, it is possible to simultaneously set focus on two focus target objects by performing tilt control and focus control. For example, focus is set first on one object by using the AF function, and tilt control and focus control are subsequently performed so that the focus position will be set on the other object while maintaining focus on the first object. Therefore, focus can be automatically set on both of the two objects which are at different distances from the image capturing apparatus.

Fourth Embodiment

In the above-described embodiments, for example, each processing unit shown in FIG. 1 or the like is implemented by dedicated hardware. However, some or all of the processing units included in an information processing apparatus 100 may be implemented by a computer. In this embodiment, at least a part of the processing according to each of the embodiments described above is executed by a computer.

Figure 11:
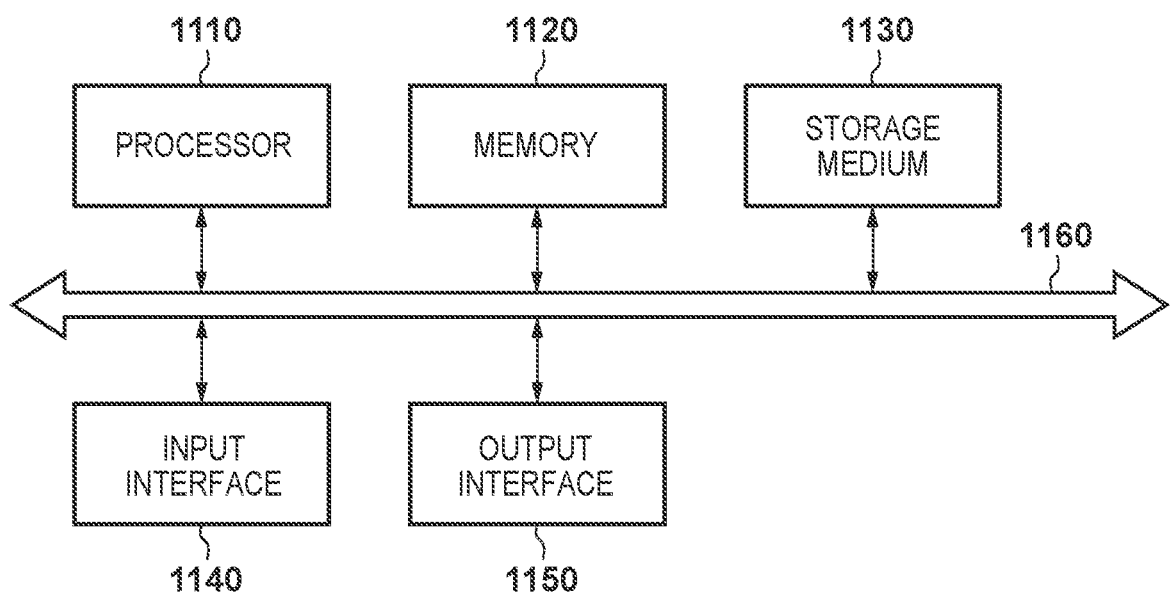
FIG. 11 is a block diagram showing the functional arrangement of a computer according to the third embodiment.

FIG. 11 is a block diagram showing the basic arrangement of a computer. In FIG. 11, a processor 1110 is, for example, a CPU and controls the operation of the entire computer. A memory 1120 is, for example, a RAM and temporarily stores programs, data, and the like. A computer-readable storage medium 1130 is, for example, a hard disk, a CD-ROM, or the like and stores programs, data, and the like for long-term storage. In this embodiment, each program which is stored in the storage medium 1130 and used to implement the function of a corresponding unit is read out to the memory 1120. The function of each unit is implemented by causing the processor 1110 to operate in accordance with the program on the memory 1120.

In FIG. 11, an input interface 1140 is an interface for obtaining information from an external apparatus. Also, an output interface 1150 is an interface for outputting information to an external apparatus. A bus 1160 connects the above-described units and allows data to be exchanged.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-154009, filed Sep. 14, 2020 and No. 2021-105980, filed Jun. 25, 2021 which are hereby incorporated by reference herein in their entirety.

What is claimed is:

1. An information processing apparatus comprising:
   a hardware processor; and
   a memory for storing instructions to be executed by the hardware processor, wherein, when the instructions stored in the memory are executed by the hardware processor, the information processing apparatus functions as:
   a control unit configured to perform tilt control for tilting an image capturing element with respect to a plane perpendicular to an optical axis of an image capturing optical system about a rotation axis, and perform focus control for moving a focus lens in a direction of the optical axis;
   a setting unit configured to set a target region in a captured image obtained by an image capturing unit; and
   a determining unit configured to determine, based on a position corresponding to a position of the rotation axis in the image and a position of the target region in the image, a correction amount of a position of the focus lens,
   wherein the control unit moves the focus lens based on the correction amount.

2. The apparatus according to claim 1, wherein the determining unit determines the correction amount so that the correction amount of the position of the focus lens will increase as a distance from the rotation axis of the image capturing element to a position corresponding to the target region increases.

3. The apparatus according to claim 1, wherein the determining unit determines the correction amount of the position of the focus lens further based on a rotation angle of rotating by the tilt control.

4. The apparatus according to claim 3, wherein the determining unit determines the rotation angle of the rotating, based on a current rotation angle of one of the image capturing element and the image capturing optical system and a target rotation angle of the tilt control.

5. The apparatus according to claim 3, wherein the determining unit determines the correction amount so that the correction amount of the position of the focus lens will increase as a rotation range of the rotating increases.

6. The apparatus according to claim 1, wherein the control unit controls the position of the focus lens at a speed corresponding to a control speed of rotating by the tilt control.

7. The apparatus according to claim 6, wherein the control unit moves the focus lens to complete the focus control simultaneously with completion of the tilt control.

8. The apparatus according to claim 6, wherein the control unit controls the position of the focus lens at a speed corresponding to a rotation angle of one of the image capturing element and the image capturing optical system during the tilt control.

9. The apparatus according to claim 8, wherein the control unit increases a speed at which the position of the focus lens is controlled as an absolute value of the rotation angle of one of the image capturing element and the image capturing optical system during the tilt control increases within a range of 0° to 90°.

10. The apparatus according to claim 1, wherein in a case in which the tilt control is to be stopped, the determining unit determines the correction amount in accordance with a rotation angle of one of the image capturing element and the image capturing optical system at a point of time when the tilt control is to be stopped.

11. The apparatus according to claim 1, wherein the determining unit determines not less than two correction amounts with respect to an instruction to perform one tilt control operation, and the control unit adjusts, based on the not less than two correction amounts, the position of the focus lens over a plurality of times with respect to the instruction to perform the one tilt control operation.

12. The apparatus according to claim 11, wherein during the one tilt control operation, the control unit sequentially adjusts the position of the focus lens based on each of adjustments of the position of the focus lens performed over the plurality of times.

13. The apparatus according to claim 1, wherein the target region is one of a region designated by a user and a region automatically detected as a detection target in the captured image.

14. The apparatus according to claim 1, wherein the determining unit determines the correction amount of the position of the focus lens in accordance with a shift in the focus on the target region by the tilt control.

15. The apparatus according to claim 1, wherein, when the instructions stored in the memory are executed by the hardware processor, the apparatus further functions as a deciding unit configured to decide a control value of the tilt control so that both a first target region and a second target region will be in focus by the correction of the position of the focus lens.

16. The apparatus according to claim 15, wherein, when the instructions stored in the memory are executed by the hardware processor, the apparatus further functions as:

an adjusting unit configured to adjust, before the tilt control is performed, the position of the focus lens so as to set focus on the first target region, wherein the tilt control is performed while maintaining a state in which focus is set on the first target region.

17. The apparatus according to claim 16, wherein the setting unit further sets a degree of priority for each target region, and the degree of priority set for the first target region is higher than the degree of priority set for the second target region.

18. An information processing method comprising:

performing tilt control for tilting an image capturing element with respect to a plane perpendicular to an optical axis of an image capturing optical system about a rotation axis, and perform focus control for moving a focus lens in a direction of the optical axis;

setting a target region in a captured image obtained by an image capturing unit; and determining, based on a position corresponding to a position of the rotation axis in the image and a position of the target region in the image, a correction amount of a position of the focus lens, wherein the focus lens is moved based on the correction amount.

19. A non-transitory computer-readable storage medium storing a program that, when executed by a computer, causes the computer to perform a method, the method comprising:

performing tilt control for tilting an image capturing element with respect to a plane perpendicular to an optical axis of an image capturing optical system about a rotation axis, and perform focus control for moving a focus lens in a direction of the optical axis;

setting a target region in a captured image obtained by an image capturing unit; and determining, based on a position corresponding to a position of the rotation axis in the image and a position of the target region in the image, a correction amount of a position of the focus lens, wherein the focus lens is moved based on the correction amount.

* * * * *